Figure 1:
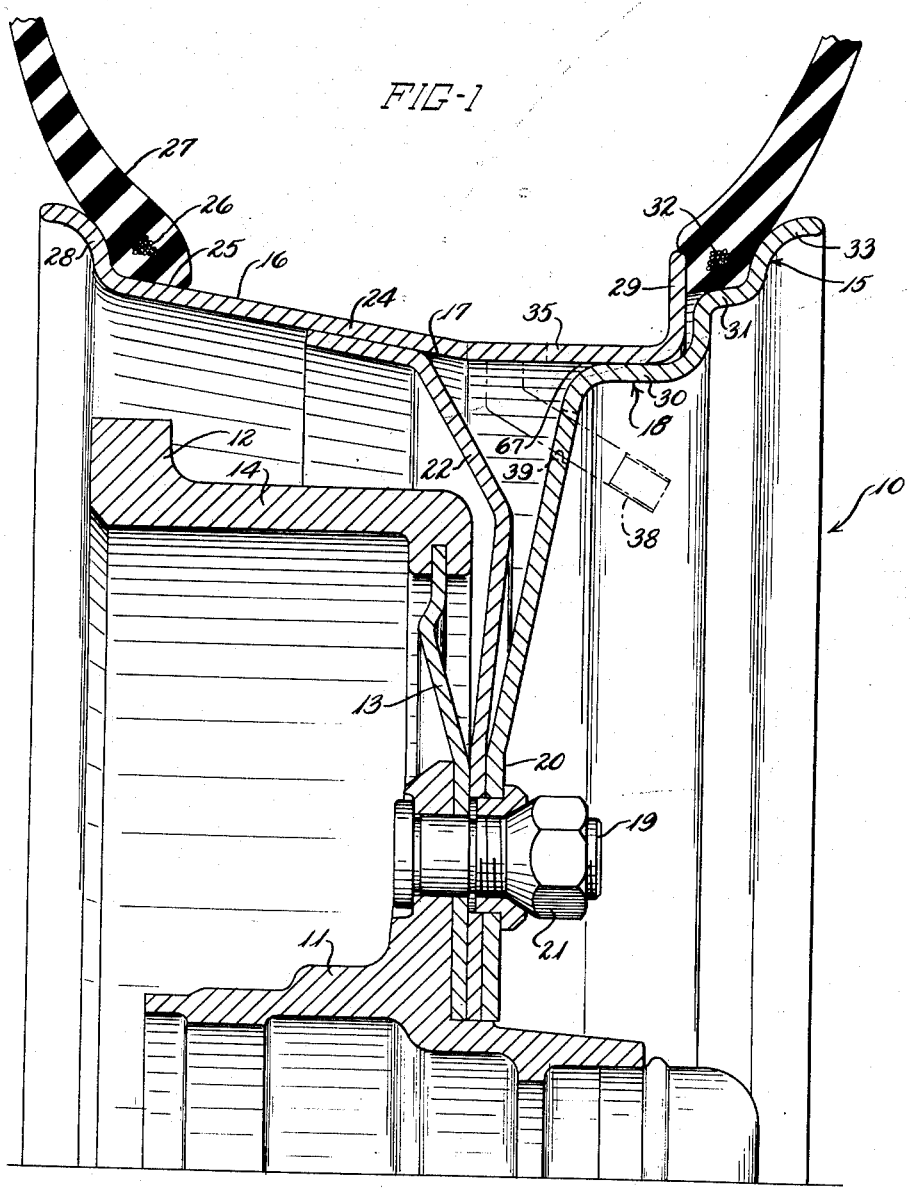

INVENTORS
ROBERT P. POWERS
HARRY MULDER
BY DENNY FORDYCE JR.
W. A. Fraser
ATTY.

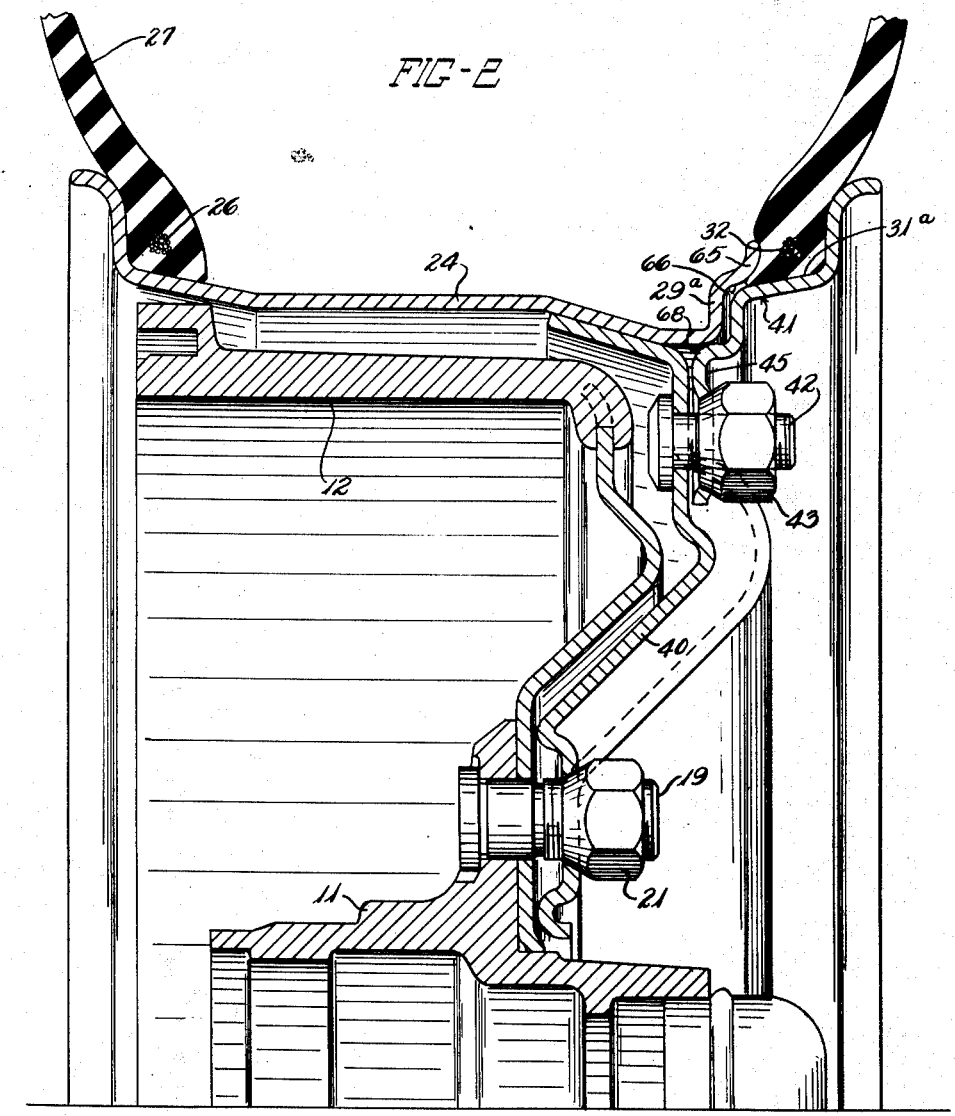

United States Patent Office 2,868,260
Patented Jan. 13, 1959

2,868,260
WHEEL CONSTRUCTION

Robert P. Powers and Harry Mulder, Akron, and Denny Fordyce, Jr., Barberton, Ohio, assignors to The Firestone Tire & Rubber Company, Akron, Ohio, a corporation of Ohio Application July 6, 1955, Serial No. 520,323

3 Claims. (Cl. 152—396)

This invention relates to automobile wheels and rims and more particularly to a wheel and rim adapted for use with tubeless tires.

A primary object of the invention is to provide a wheel and rim construction which enables a wheel of small diameter to be used with present day brake constructions. A more specific object is to provide a positive bead lock for one of the beads of the tire mounted on a rim of the present invention. Another object is to provide a multi-part rim which is automatically sealed against the loss of air by means of one of the tire beads thus obviating the need for an auxiliary gasket or the like. Other objects are to provide a rim construction which enables a tire to be easily mounted thereon, which is cheap and economical to manufacture and which is easy to mount on and dismount from a car.

These and further objects and advantages will be more fully apparent from the following description of two forms of the invention, reference being had to the accompanying drawings, in which:

Figure 1 is a partly fragmentary, radial section of a tire and one form of wheel and rim embodying the invention; and Figure 2 is a view similar to Figure 1 showing a modification of the invention.

The invention is illustrated and described in connection with a wheel construction for a passenger automobile but it will be appreciated that the principles of the invention may be equally well adapted for the wheels of trucks and other vehicles.

Thus, in the drawings, an automobile wheel construction indicated generally at 10 comprises a hub construction 11 supporting a brake drum 12 which is more or less conventional in construction comprising a central disc portion 13 and an axially extending flange 14.

The wheel is completed by a rim indicated generally at 15 which comprises a part 16 viewed at the left of Figure 1 which is adapted to be permanently secured to the wheel as at 17 and a removable part, indicated generally at 18, which is removably secured to the part 16 and to the wheel by means of a plurality of bolts 19 which pass through the body portion 20 of the part 18 and which are engaged by the nuts 21.

The fixed part 16 comprises a radially extending body disc 22 which is welded to and which supports a rim base 24 which extends inwardly in cantilever fashion over the brake drum 12. The rim base has a bead seat portion 25 extending at any desired angle but preferably at about an angle of 5° to the axis of the tire to receive and support the bead 26 of a tire 27 which is mounted thereon. The base 24 terminates at the left, as viewed, in a conventional side flange 28, and terminates at the right, in a substantially radial flange 29 which is appreciably smaller in diameter than the diameter of the side flange 28.

The removable part 18 comprises a stepped construction in which the body portion 20 terminates in an axial portion 30 adapted to have a telescoping relationship with the rim base 24 adjacent the radial flange 29 of the cooperating part 16 and a second axial portion 31 which serves as a bead seat for the corresponding bead 32 of the tire. The bead seat portion 31 extends at substantially the same angle and has the same dimensions as the bead seat 25 and it terminates in a side flange 33 which is substantially identical with the side flange 28.

The parts are assembled with a tire by first placing the left bead 26 of the tire over the radial flange 29, by taking advantage of the drop center well portion 35 of the base 24, and then manually forcing the bead 26 to the left as viewed in Figure 1 until it makes sufficient contact with the base of the rim to hold air when the tire is subsequently inflated. The part 18 is then placed against the tire with the bead seat portion 31 and the side flange 33 engaging the tire bead 32 and forcing it into contact with the radial flange 29. The nuts 21 are then threaded onto the bolts 19 and screwed down tight to draw the part 18 tightly against the part 16 and to secure it firmly on the wheel.

As the nuts 21 are drawn tight, the tire bead 32 is compressed tightly between radial flange 29 and the side flange 33 thereby providing an effective seal between parts 16 and 18 to retain air within the tire and rim. It should be noted that the flanges 29 and 33 have the further function of locking the tire bead 32 firmly in position, preventing it from being dislodged in the event the tire blows out and thereby producing a wheel which is much safer in operation than one lacking such a bead lock.

The internal diameter of the base 24 in the region indicated at 67 adjacent flange 29 and the external diameter of the stepped portion 30 as mentioned before preferably have a telescoping relationship and the dimensions of the parts are preferably such as to provide a tight sliding fit with the parts mutually supporting each other as shown; although this is not necessary, and in some cases it may be desirable to provide an appreciable clearance between the parts. The presence of such a clearance would facilitate assembly of the parts and make the dimensions and tolerances less critical.

The tire is inflated through a valve 38 which is conventional in structure and which has a sealing fit with the base 24 so that inflationary air will be retained within the tire. The valve 38 is bent at an angle, as shown, to enable it to pass through a suitable aperture 39 in part 18 but the valve need not make a sealing fit with the part 18 inasmuch as there is no communication with the interior of the tire at such a point.

The modified wheel shown in Figure 2 differs from that of Figure 1 principally in the manner of securing the parts corresponding to parts 16 and 18 to the wheel and in the construction of the outside flanges which clamp the outer tire bead. In the following description of this form of the invention the same reference characters will be applied to parts which are essentially the same in construction and function as the corresponding parts in Figure 1.

The wheel of Figure 1 is of advantage where it is desirable to replace a tire without removing the wheel from the vehicle. In many cases however, it may be desirable to replace the wheel and tire as a unit and the form of Figure 2 is advantageously used in such cases. The wheel of Figure 2 accordingly has a disc portion 40 supporting the rim base 24 and this disc is removably secured to the hub by the bolts 19 and nuts 21. With this construction the cooperating part 41, which corresponds to part 18 in Figure 1, may take the form of a ring which is removably secured to the disc 40 by bolts 42 and nuts 43 as shown. The radially inward portion of the ring 41 through which the bolts extend may be a continuous annulus but preferably the bolts 42 extend through inwardly directed circumferentially spaced tabs 45. Such an arrangement makes the wheel easy to remove and facilitates mounting of the tire on the rim.

As mentioned above, the modification of Figure 2 differs from the wheel of Figure 1, also with respect to the supporting structure for the outer bead 32 of the tire. It will be noted in Figure 1 that the bead seat portion 31 is somewhat narrower than the inner surface of tire bead 32 with the result that the toe of the tire bead projects inwardly beyond the seat 31 so that it will be clamped by the radial flange 29. The axial extent of the tire bead seat 31 accordingly is appreciably smaller than the narrowest tire bead which will be used with the wheel to insure that every bead will be so clamped thereby insuring a positive seal and a positive lock of the bead in position. If the bead seat 31 were wider than the narrowest such tire bead, the tire bead would be out of sealing contact with the radial flange 29 and the air could escape from the interior of the tire by passing between the parts 16 and 18. With the construction of Figure 1, therefore, in order to obtain a seal, the toe of the tire bead 32 lacks direct radial support.

In the wheel construction of Figure 2 the bead seat 31a is appreciably larger than the largest tire bead which would be used with the wheel thereby insuring that full radial support is given to the bead. In order to insure a seal as well as a positive clamping of the bead 32, the flange 29a is turned outwardly to form an annular axial projection 65 and the inner surface of 66 is formed to be appreciably larger in diameter than the seat portion 31a. The projection 65 is long enough to reach over seat 31a and forcibly contact every tire bead which is used with the wheel. It will be observed that the clearances indicated at 67 in Figure 1 and at 68 in Figure 2 insure clamping contact of the parts with the tire bead 32. It should be noted also that the projection 65 is slightly rounded to prevent its cutting into the tire bead.

The rim constructions shown are simple and easy to use in service. Either form enables wheels of small diameters, either 13 or 14 inches in diameter, to be used with the same brake drums which are presently used with wheels of 15 and 16 inch diameters. The construction provides a positive seal of the tire between the tire and the rim and provides a safety in performance which is greatly desired.

Various modifications and changes will no doubt occur to those skilled in the art without departing from the spirit and scope of the invention. For example, the number and the circumferential spacing of the nuts and bolts which are used to assemble the parts may vary. The dimensions of the radial flanges 29 and 29a may also vary depending primarily upon the ease of mounting which is desired, the smaller the flange diameter the easier the mounting of a tire bead over the flange. The essential features of the invention are summarized in the appended claims.

We claim:

1. A wheel construction for an open bead type tubeless tire comprising a hub portion, a disc portion extending radially outwardly from said hub and supporting a rim base, said base comprising an integral, endless channel member terminating at one edge in an axially outer first side flange and having a first bead seat immediately adjacent said flange, said rim base having a drop center well portion having a diameter substantially less than the diameter of said first bead seat, said base terminating at its other edge in a radially outwardly extending, intermediate flange opposite said first side flange, said intermediate flange having an outer diameter appreciably less than the outer diameter of the first side flange but greater than the largest diameter of said bead seat, and an endless, integral, removable clamping ring comprising a radial portion adapted to be assembled with said disc portion, said removable clamping ring having a second bead seat of substantially the same diameter as said first bead seat adjacent said intermediate flange when said base and ring are assembled, said second bead seat terminating at an axially outward side flange, said second bead seat having a width narrower than the width of the thickest portion of the bead of a tire normally mounted on said wheel.

2. The wheel of claim 1 in which said removable clamping ring has an axially extending portion having a tight telescoping fit within the drop-center well portion of said base adjacent said intermediate flange when said base and ring are assembled.

3. In combination, an open-beaded tubeless tire and a wheel therefor, said wheel comprising a hub portion, a disc portion extending radially outwardly from said hub and supporting a rim base, said rim base comprising an integral, endless channel member terminating at one edge in an axially outer first side flange, said rim base having a first bead seat immediately adjacent said flange to support one of the beads of said tire, said base having a drop center well portion whose diameter is substantially less than the diameter of said first bead seat, said base terminating at its other edge in a radially outwardly extending, intermediate flange opposite said first side flange, said intermediate flange having an outer diameter appreciably less than the outer diameter of the first side flange but greater than the largest diameter of said bead seat, and an endless, integral, removable clamping ring comprising a radial portion adapted to be assembled with said disc portion, said removable clamping ring having a second bead seat of substantially the same diameter as said first bead seat and positioned adjacent said intermediate flange when said base and ring are assembled, said second bead seat terminating at an axially outward side flange, said second bead seat having a width narrower than the width of the thickest portion of the other bead of said tire, said second bead being compressed between said intermediate flange and said second side flange to create an air-tight seal between said base and id ring.

References Cited in the file of this patent

UNITED STATES PATENTS

| | | |
|---|---|---|
| 1,862,313 | La Brie | June 7, 1932 |
| 1,939,935 | Wagenhorst | Dec. 19, 1933 |
| 2,405,954 | Hollerith | Aug. 20, 1946 |
| 2,576,736 | Watkins | Nov. 27, 1951 |